L. R. WITHERELL.

Assignor to DAVID W. SICKLES.

Compositions for Lining and Repairing Stoves.

No. 7,958. Reissued Nov. 20, 1877.

*Attest:*
J. W. Read.
August Herstlw.

*Inventor:*
Loren R. Witherell,
by Louis Bagger & Co.
attys.

UNITED STATES PATENT OFFICE.

LOREN R. WITHERELL, OF DAVENPORT, IOWA, ASSIGNOR TO DAVID W. SICKELS, OF MOLINE, ILLINOIS.

IMPROVEMENT IN COMPOSITIONS FOR LINING AND REPAIRING STOVES.

Specification forming part of Letters Patent No. 157,955, dated December 22, 1874; Reissue No. 7,958, dated November 20, 1877; application filed November 6, 1877.

*To all whom it may concern:*

Be it known that I, LOREN R. WITHERELL, of Davenport, in the county of Scott and State of Iowa, have invented certain new and useful Improvements in Stove-Lining Material; and I do hereby declare that the following is a full, clear, and exact description thereof, that will enable others skilled in the art to which it appertains to make and use the same, reference being had to the accompanying drawing, which forms a part of this specification.

This invention relates to an improvement in argillaceous material for fire-clay; and consists in mixing and preparing the best combinations for withstanding the heat without shrinking or cracking, and which, either by pulverizing and packing it into boxes, or molding it into blocks of suitable size and shape, is an article of manufacture which is always ready for use, and may be put upon the market in sacks, barrels, or boxes, substantially as hereinafter more fully set forth.

Figure 2:
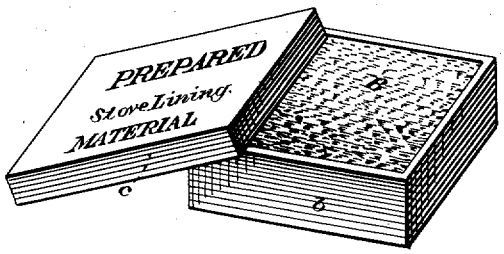

This article in its pulverized state, packed in a box, is represented on Figure 2 of the drawings hereto annexed, in which B denotes the material in its powdered state, ready for use; *b*, the box, and *c* the cover with its label.

Figure 1:
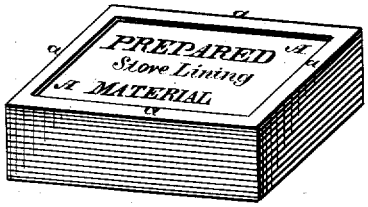

In Fig. 1, I have represented the same article or material in a different form—viz., a square brick or block, A, having preferably (but not necessarily) a raised edge or flange, *a*, and suitable words stamped on the top, sides, or bottom.

In either of these two forms the material is ready for immediate use. In its powdered state a suitable quantity is taken from the box, made into a plastic cement by moistening, and applied, without further preparation, to the defective part of the stove. When used in the form of a brick or block, a piece of suitable size is broken off, reduced to a thick plastic cement by the addition of a suitable quantity of water, and applied as required. Some persons prefer the powder, and others the blocks. The latter have the advantage of saving the cost of boxes and labels.

My improved stove-lining and repairing material is prepared by mixing native or clear fire-clay with burnt fire-clay, or any suitable substance that will prevent it from shrinking too much. This mixture is then either dried and pulverized into a coarse powder, or, if necessary, wetted and molded into bricks or blocks of suitable size and with a suitable inscription, in the same manner as artificial Bath brick, and other similar material.

I am aware that fire-clay in the neighborhood of potteries has been used to a limited extent for lining and repairing stoves; but as it was available only in a few localities, and as but few people understood how to use it with satisfactory results even when it could be obtained, it was comparatively worthless and unused.

Having thus described my invention, I claim and desire to secure by Letters Patent of the United States—

As a new article of manufacture, a stove-lining and repairing material, consisting of native or clear fire-clay, mixed with burnt and powdered fire-clay, substantially as and for the purpose herein specified.

In testimony that I claim the foregoing I have hereunto set my hand this 14th day of July, 1877.

LOREN R. WITHERELL.

Witnesses:

CHAS. H. ELDRIDGE,
ROBERT SICKELS.